(12) United States Patent
Choi et al.

(10) Patent No.: US 8,030,237 B2
(45) Date of Patent: Oct. 4, 2011

(54) DIELECTRIC THIN FILM COMPOSITION SHOWING LINEAR DIELECTRIC PROPERTIES

(75) Inventors: Ji-Won Choi, Seoul (KR); Won Kook Choi, Seoul (KR); Seok-Jin Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 152 days.

(21) Appl. No.: 12/537,198

(22) Filed: Aug. 6, 2009

(65) Prior Publication Data

US 2010/0035749 A1     Feb. 11, 2010

(30) Foreign Application Priority Data

Aug. 8, 2008   (KR) ........................ 10-2008-0077784

(51) Int. Cl.
    *C04B 35/468*     (2006.01)
    *C04B 35/47*     (2006.01)
(52) U.S. Cl. ..................... 501/137; 501/138; 501/139
(58) Field of Classification Search ................. 501/137, 501/138, 139
    See application file for complete search history.

(56) References Cited

U.S. PATENT DOCUMENTS

| | | | | |
|---|---|---|---|---|
| 3,637,532 | A * | 1/1972 | Ramisch et al. | 252/520.1 |
| 4,404,029 | A * | 9/1983 | Iwaya et al. | 501/139 |
| 4,477,581 | A * | 10/1984 | Nishioka et al. | 501/137 |
| 4,960,739 | A * | 10/1990 | Kageyama | 501/137 |
| 5,520,992 | A | 5/1996 | Douglas et al. | |
| 5,604,167 | A * | 2/1997 | Wilson et al. | 501/138 |
| 6,077,802 | A * | 6/2000 | Hahn et al. | 501/134 |
| 7,595,975 | B2 * | 9/2009 | Suzuki et al. | 361/321.4 |
| 2001/0055820 | A1 | 12/2001 | Sakurai et al. | |

FOREIGN PATENT DOCUMENTS

| | | | |
|---|---|---|---|
| JP | 45-4952 | * | 2/1970 |
| JP | 04357609 | * | 12/1992 |
| JP | 09012357 | * | 1/1997 |
| KR | 10-0325967 B1 | | 2/2002 |
| WO | WO 02/056669 A2 | | 7/2002 |

OTHER PUBLICATIONS

Zhai Jiwei, "The Microstructure Characteristics and Dielectric Proprties of (Ba,Sr)(Sn,Ti)$O_3$ Thin Films Grown by a Sol-Gel Process," Ferroelectrics, 329:23-27, 2005.

Extended European Search Report for EP 09010308.6-1218, 5 pages, mailed Aug. 18, 2010.

Wang et al., "Preparation and characterization of $(Ba_{1-x}Sr_x)(Ti_{0.9}Sn_{0.1})O_3$ thin films deposited on $Pt/Ti/SiO_2/Si$ substrate by RF magnetron sputtering," Journal of Crystal Growth 241:439-447 (2002).

Wang et al., "Structural and dielectric characterization of the $(Ba_{1-x}Sr_x)(Ti_{0.9}Sn_{0.1})O_3$ thin films deposited on $Pt/Ti/SiO_2/Si$ substrate by radio frequency magnetron sputtering," Journal of Applied Physics 92(4):2100-2107 (Aug. 15, 2002).

* cited by examiner

*Primary Examiner* — Karl Group
(74) *Attorney, Agent, or Firm* — Ladas & Parry LLP

(57) ABSTRACT

The present invention relates to a dielectric thin film composition showing linear dielectric properties, in which tin oxides ($SnO_2$) are introduced into a (Ba,Sr)$TiO_3$ (BSTO) dielectric thin film in a continuous diffusion gradient manner in composition. Since the non-linear dielectric properties of BSTO are converted to linear dielectric properties by the addition of $SnO_2$ according to the present invention, the dielectric thin film composition of the present invention is characterized in that: there is little change in the capacitance according to the applied electric field; it has a high dielectric constant capable of showing a desired capacitance even at a thickness suitable for preventing the occurrence of electron tunneling; and it exhibits paraelectric properties similar to the conventional dielectric substances such as $SiO_2$ while having a very low dielectric loss.

2 Claims, 6 Drawing Sheets

DIELECTRIC THIN FILM COMPOSITION SHOWING LINEAR DIELECTRIC PROPERTIES

The present application claims priority to Korean Patent Application No. 10-2008-77784, filed Aug. 8, 2008, the subject matter of which is incorporated herein by reference in its entirety.

FIELD OF THE INVENTION

The present invention relates to a dielectric thin film composition showing linear dielectric properties, which is represented by the general formula $Ba_{(1-x)}Sr_xTi_{(1-y)}Sn_yO_3$ (BSTSO) where mole fraction x is $0.06 \leq x \leq 0.82$ and mole fraction y is $0.05 \leq y \leq 0.28$.

BACKGROUND OF THE INVENTION

As large scale integrated circuits based on silicon are being developed, there are problems with a decrease in the electric properties of DRAM (dynamic random access memory). In particular, the effective thickness of a $SiO_2$ layer used as a capacitor thin film of DRAM gradually decreases due to the large scale integration, resulting in a leakage current caused by electron tunneling. To solve these problems, a method has been developed for improving integrated circuit reliability by etching trenches into the silicon of a semiconductor substrate, and thereby, increasing the effective surface area thereof. However, the above method is facing limitations in terms of the diversification of the final product image. As for other methods, there is a method of increasing the dielectric constant of a dielectric thin film. The larger the dielectric constant of a dielectric thin film is, the thicker the effective thickness thereof can be; thus, a great deal of research is being conducted on the above method.

In particular, in order to develop new materials for a dielectric thin film having a high dielectric constant sufficient for replacing $SiO_2$ ($\in_r \approx 4$), a number of studies have been conducted on materials having an intermediate dielectric constant such as amorphous Si—O—N ($\in_r \approx 6$), amorphous or crystalline $Ta_2O_5$ ($\in_r \approx 23$), Zr—Sn—Ti—O ($\in_r \approx 50$) and the like, as well as those having a high dielectric constant such as $(Ba,Sr)TiO_3$ (BSTO, $\in_r \approx 200$). BSTO is being regarded as a potential candidate for the next-generation dielectric thin film for G-bit scale DRAMs due to its high dielectric constant, low temperature coefficient, excellent compatibility with silicon devices, and the like. However, in the field of silicon devices, there has been a reluctance to use BSTO as an alternative dielectric thin film because BSTO exhibits non-linear dielectric properties ($\Delta C/C_0$) and high dielectric loss. Such non-linear dielectric properties (i.e., tunability) are suitable for tunable devices such as tunable filters, but severely affects the operation of DRAM devices. Further, in order to utilize BSTO as a DRAM device, its dielectric loss must be lower than 0.005. However, the dielectric loss of the currently available BSTO thin films is only 0.02. It has been reported that the dielectric loss of the BSTO thin film can be reduced by up to 0.01 by regulating various physical properties, including texturing, interface, stress, surface roughness and microstructure of the thin film, but there is still a need to reduce the above dielectric loss by half.

Memory integrated circuits based on semi-conductors such as DRAM require a capacitor layer for storing electric charges and can be utilized as a memory device by utilizing the electrically charged/uncharged states of the above capacitor layer. The capacitance value of the capacitor layer is proportional to the surface area and dielectric constant thereof while being inversely proportional to the thickness thereof. Therefore, in case of using dielectric substances having the same dielectric constant in the large scale integration of a semi-conductor device, the surface area of the capacitor layer is reduced. Thus, in order to achieve the desired level of capacitance, the thickness of the dielectric thin film must be reduced. Currently, as the integration efficiencies of semiconductor devices improve, methods of reducing the thickness of a dielectric thin film (mainly, $SiO_2$) are mostly used, but such methods will soon reach limits in the field of next-generation G-bit scale DRAMs, and finally, face problems in terms of large leakage currents.

The present inventors have therefore carried out research to solve the above problems with the conventional methods and found that, when $SnO_2$ is added to a BSTO dielectric thin film by a continuous diffusion gradient manner in composition, non-linear dielectric properties of BSTO are converted into linear dielectric properties. The thus obtained linear dielectric thin film composition has several advantages in that: there is little change in the capacitance according to the applied electric field; it has a high dielectric constant capable of showing a desired capacitance even at a thickness suitable for preventing the occurrence of electron tunneling; and it exhibits paraelectric properties similar to the conventional dielectric substances such as $SiO_2$ while having a very low dielectric loss.

SUMMARY OF THE INVENTION

One of the objectives of the present invention is to provide a linear dielectric thin film composition showing linear dielectric properties of a high dielectric constant, low dielectric loss and poor tunability.

In order to achieve the above objective, one embodiment of the present invention relates to a dielectric thin film composition showing linear dielectric properties represented by the following formula (I) in which tin oxides ($SnO_2$) are introduced into a (Ba,Sr)$TiO_3$ (BSTO) dielectric thin film by a continuous diffusion gradient manner in composition:

$$Ba_{(1-x)}Sr_xTi_{(1-y)}Sn_yO_3 \text{ (BSTSO)} \quad (I)$$

where mole fraction x is $0.06 \leq x \leq 0.82$, and mole fraction y is $0.05 \leq y \leq 0.28$.

BRIEF DESCRIPTION OF THE DRAWINGS

The embodiments of the present invention will be described in detail with reference to the following drawings.

A: BSTO thin film, B: BSTSO thin film

Figure 2A:
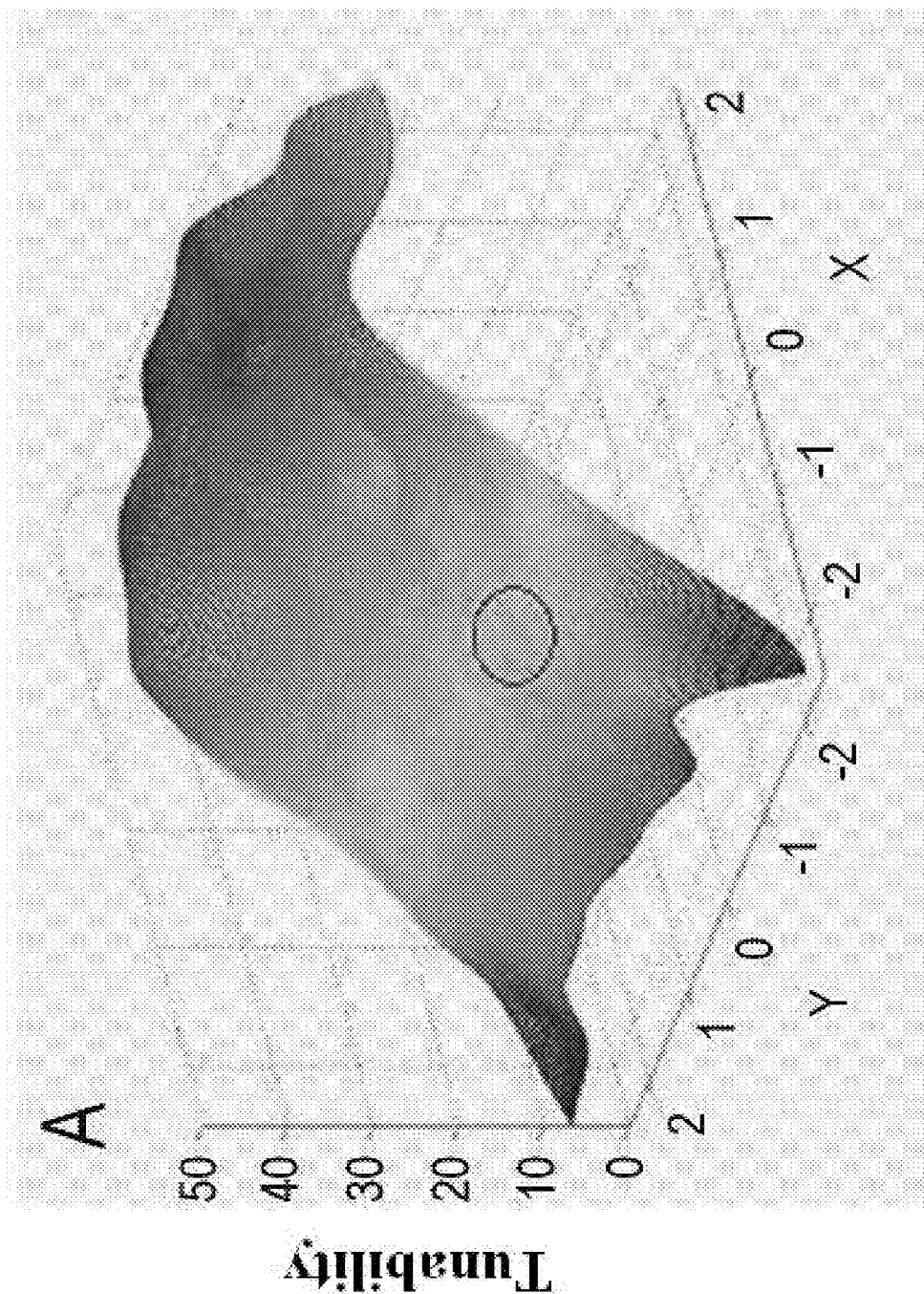
Figure 2B:
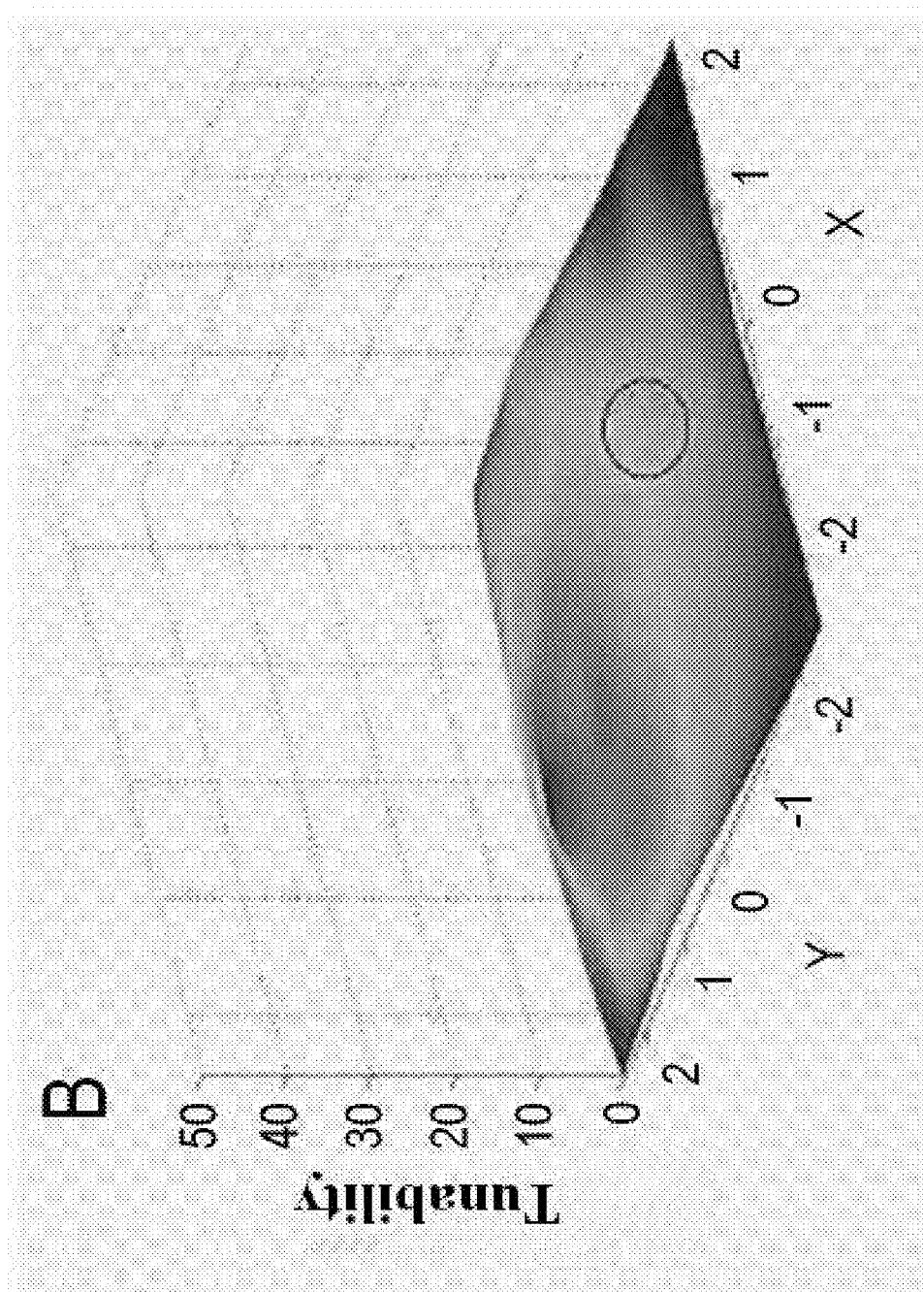

FIG. 2 shows the tunability of a BSTSO thin film fabricated by adding $SnO_2$ to a BSTO thin film in a continuous diffusion gradient manner in composition according to the present invention.

A: BSTO thin film, B: BSTSO thin film

Figure 3A:
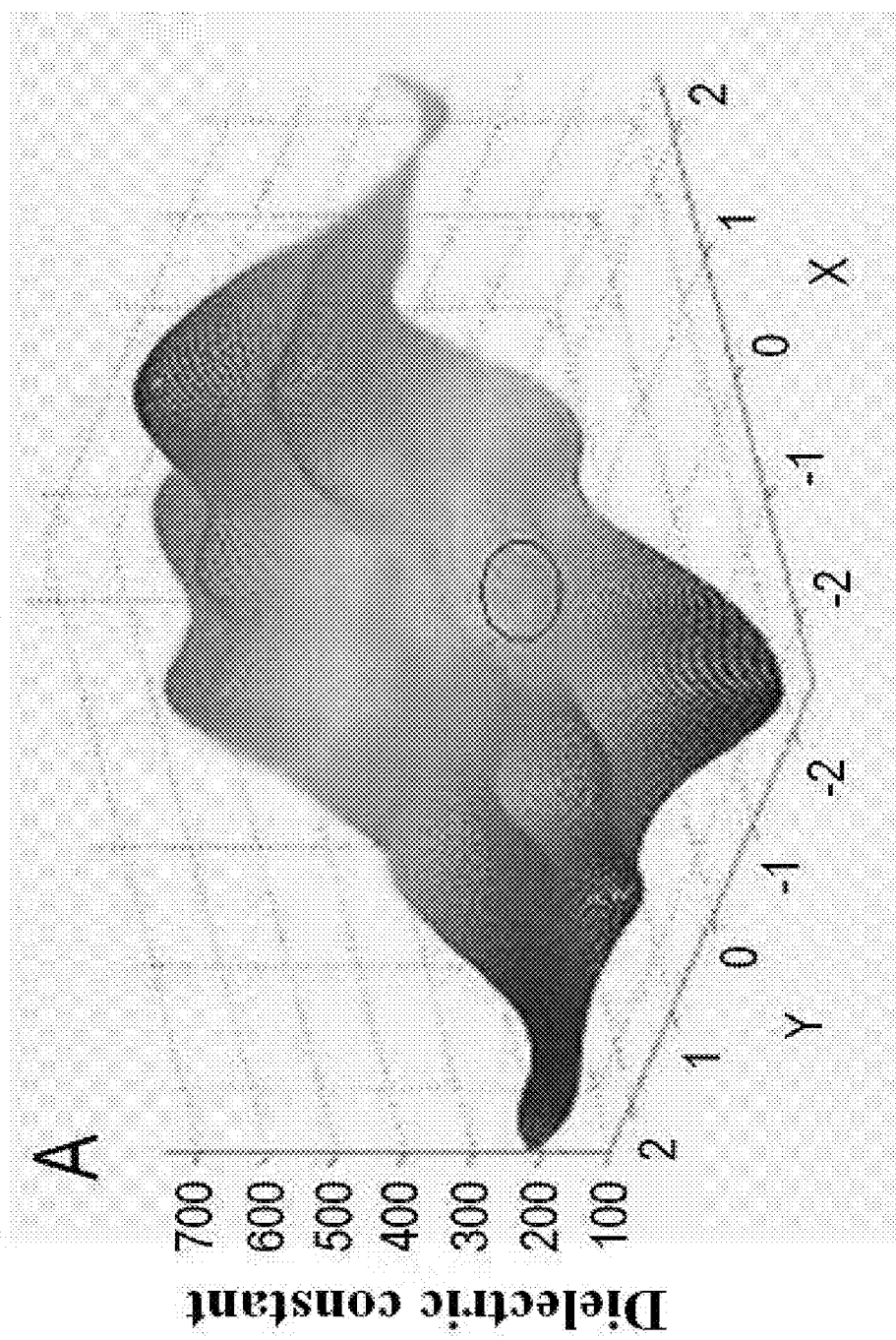
Figure 3B:
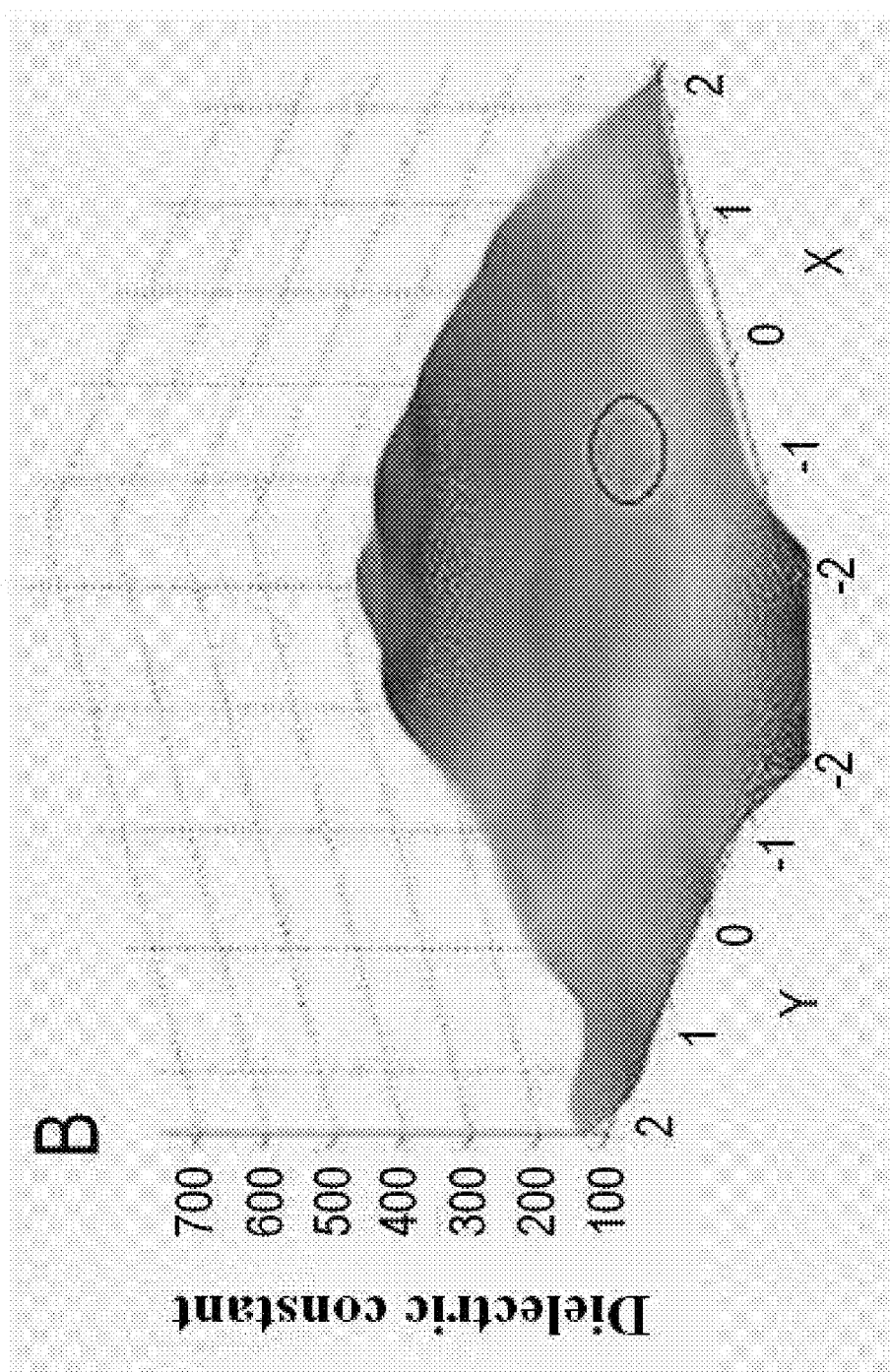

FIG. 3 shows the dielectric constant of a BSTSO thin film fabricated by adding $SnO_2$ to a BSTO thin film in a continuous diffusion gradient manner in composition according to the present invention.

A: BSTO thin film, B: BSTSO thin film

DETAILED DESCRIPTION OF THE INVENTION

The present invention provides a BSTSO dielectric thin film composition which is represented by the following formula (I):

$$Ba_{(1-x)}Sr_xTi_{(1-y)}Sn_yO_3 \text{ (BSTSO)} \quad (I)$$

where mole fraction x is $0.06 \leq x \leq 0.82$, and mole fraction y is $0.05 \leq y \leq 0.28$.

The dielectric thin film composition according to the present invention is characterized as introducing tin oxides ($SnO_2$) into a $(Ba,Sr)TiO_3$ (BSTO) dielectric thin film in a continuous diffusion gradient manner in composition, thereby converting non-linear dielectric properties of BSTO into linear dielectric properties, for example, of a high dielectric constant, low dielectric loss and poor tunability.

The objective of the present invention is to develop a dielectric thin film composition for using BSTO as a DRAM capacitor thin film by converting its non-linear dielectric properties into linear dielectric properties by a change in composition, that is, by inducing a decrease in tunability and reducing dielectric loss due to said non-linear dielectric properties. For this, the present invention utilizes the principle that when $SnO_2$ is added to BSTO in a continuous diffusion gradient manner in composition, $Ti^{+4}$ (0.061) having a smaller ionic radius is replaced with $Sn^{+4}$ (0.069 nm) having a larger ionic radius, and thus, the perovskite lattice structure between them is enlarged. As a result, the conductivity caused by electron hopping between $Ti^{+4}$ and $Ti^{+3}$ is suppressed, leading to a decrease in dielectric loss.

Based on the above principle, the characteristics of the BSTSO dielectric thin film composition in accordance with the present invention can be varied depending on the molar ratio between BSTO and $SnO_2$. For example, one embodiment of the present invention relates to a BSTSO thin film fabricated by depositing $BaTiO_3$, $SrTiO_3$ and $SnO_2$ on a substrate in a continuous diffusion gradient manner in composition at 400° C. for 20 minutes and post annealing it with heat at 650° C. for 30 minutes. At this time, as the molar ratio of $SnO_2$ increases from 5 mol % to 28 mol %, the dielectric loss of the fabricated BSTSO thin film decreases from 0.031 to 0.007, while the dielectric constant is maintained in the range of from 200 to 230 and the tunability dramatically decreases and finally reaches zero.

Therefore, it has been found that in order to convert the non-linear dielectric properties of BSTO into linear dielectric properties through enlargement of the perovskite lattice structure by ionic substitution by adding $SnO_2$ to a BSTO thin film, $SnO_2$ may be added in a molar ratio ranging from 5 to 28 mol %, or 15 to 18 mol %. If the amount of $SnO_2$ added is lower than 5 mol %, there may be problems with the dielectric loss and non-linear dielectric properties increasing. On the other hand, if the amount of $SnO_2$ added exceeds 28 mol %, there may be a problem with the dielectric constant decreasing.

The term "continuous diffusion gradient manner in composition" used herein refers to a method of depositing a thin film having continuously different compositions on different areas on a substrate by simultaneously sputtering every component in the composition to be examined with respective guns vertically opposed to each other, which makes it possible to examine the compositions having desired characteristics within a short amount of time.

As such, the BSTSO dielectric thin film composition according to the present invention in which the non-linear properties of BSTO are converted to linear dielectric properties by adding $SnO_2$ to a BSTO thin film in a continuous diffusion gradient manner in composition has several advantages: there is little change in the capacitance according to the applied electric field; it has a high dielectric constant capable of showing a desired capacitance even at a thickness suitable for preventing the occurrence of electron tunneling; and it exhibits paraelectric properties similar to the conventional dielectric substances such as $SiO_2$ while having a very low dielectric loss.

Therefore, the BSTSO dielectric thin film composition according to the present invention can be used as a functional dielectric thin film for G-bit scale DRAM capacitors, TFT (thin film transistor) and the like, thereby significantly improving the integration density of the device.

EXAMPLES

Hereinafter, the embodiments of the present invention will be described in more detail with reference to the following examples. However, the examples are only provided for purposes of illustration and are not to be construed as limiting the scope of the invention.

Example 1

In order to efficiently evaluate the dielectric properties of a BSTO thin film in which $SnO_2$ is added, a BSTSO thin film was deposited on a substrate by successively varying the molar proportions of $SnO_2$ and BSTO according to a continuous diffusion gradient manner in composition, and then, their dielectric properties deposited at different molar proportions were assessed by using 2,500 electrodes so as to develop a dielectric thin film composition having a high dielectric constant with low dielectric loss and poor tunability, as follows.

First, a BSTSO thin film in which $SnO_2$ was added to BSTO was fabricated on a 3-inch silicon wafer coated with platinum according to the reactive off-axis sputtering technique by using sputtering guns vertically opposed to each other. In particular, in order to deposit a relatively large amount of Ba having a high dielectric constant at the center of the substrate, $BaTiO_3$, $SrTiO_3$ and $SnO_2$ guns were sputtered at powers of 100 W, 100 W and 20 W, respectively. The above deposition was carried out at 400° C. for 20 minutes under a pressure of 30 mTorr in $Ar/O_2$ plasma, followed by heat treatment (post annealing) at 650° C. for 30 minutes. In order to estimate the dielectric properties of each composition, a plurality of platinum electrodes (130 nm in thickness, 3.14× $10^{-4}$ $cm^2$ in size) was deposited thereon by the electron-beam evaporation technique, to thereby form a metal-insulator-metal(MIM) structure.

The dielectric properties of the BSTSO thin film deposited were determined by measuring the loss tangent (tan δ) representing the loss properties of capacitors and dielectrics using an automated probe station at a wavelength of 100 KHz and calculating the tunability according to the equation C(0)−C (250 KV/cm)/C(0). Here, the measurement was carried out while the bias voltage was changed from a negative voltage to a positive voltage, and then swept to a negative voltage, in order to observe the hysteresis characteristics of the BSTSO thin film.

Figure 1A:
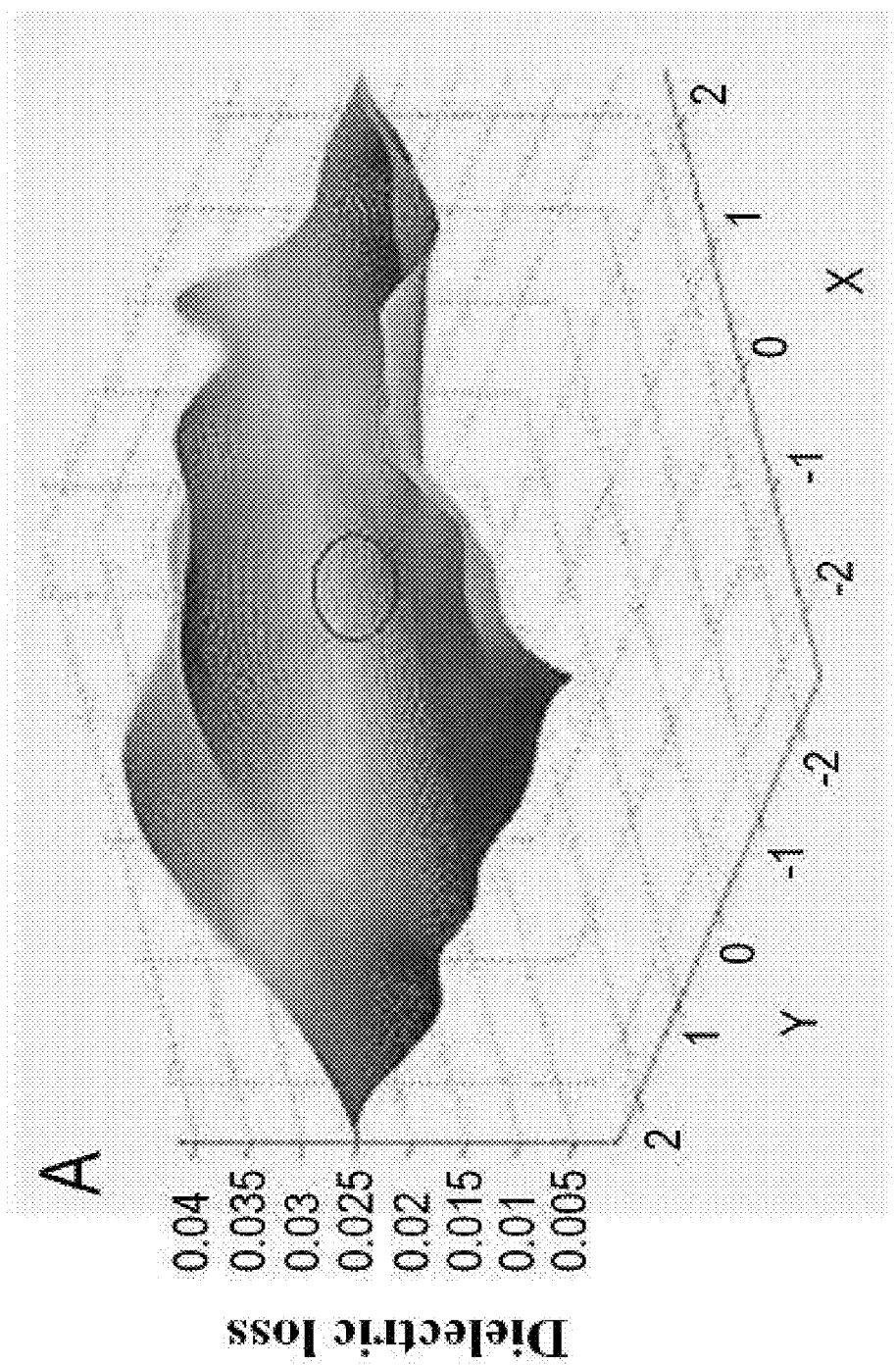
FIG. 1 shows the dielectric loss of a BSTSO thin film fabricated by adding $SnO_2$ to a BSTO thin film in a continuous diffusion gradient manner in composition according to the present invention.
Figure 1B:
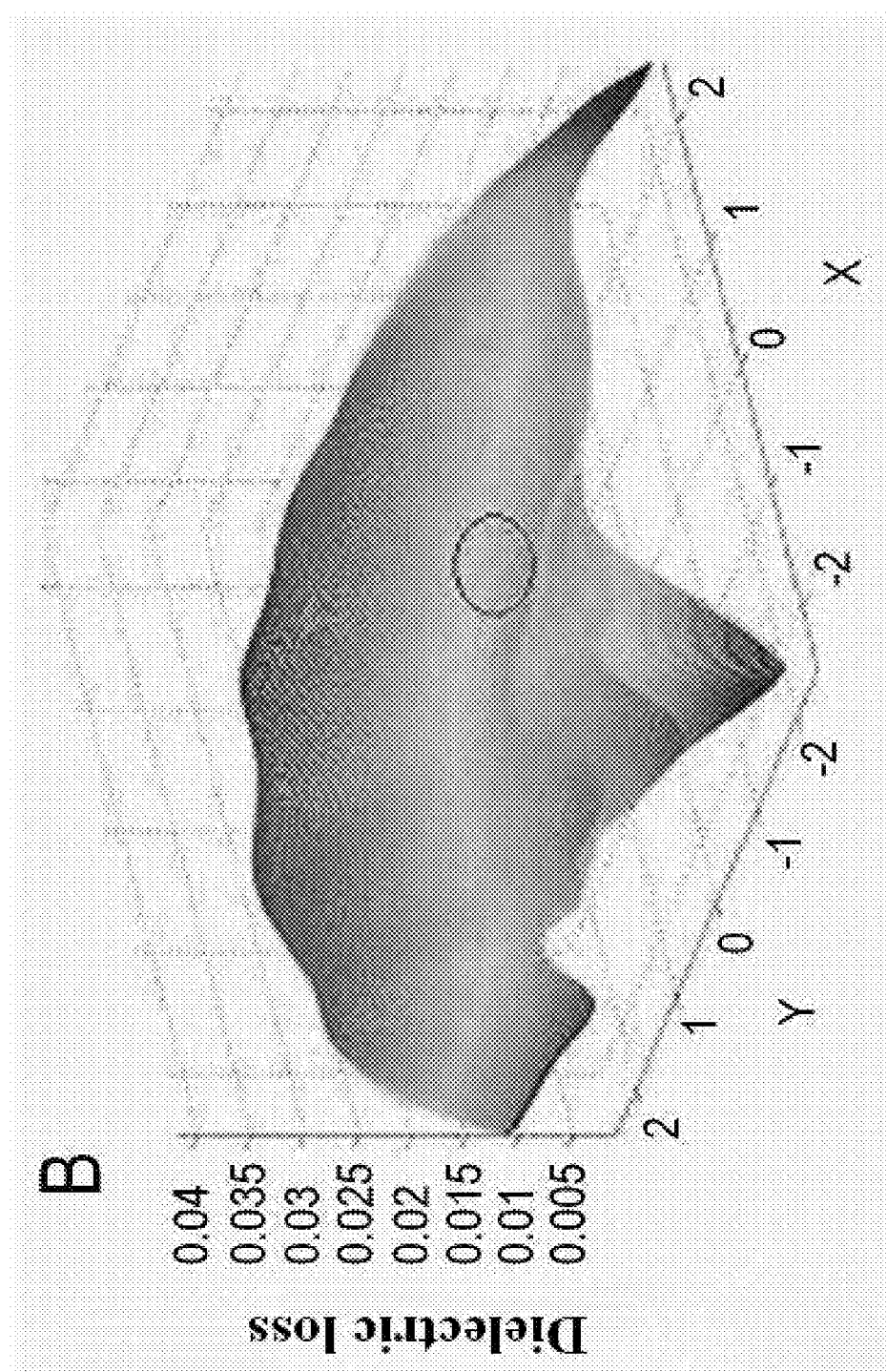

FIG. 1 shows the results comparing the dielectric loss of the BSTSO thin film fabricated by adding $SnO_2$ to a BSTO thin film in a continuous diffusion gradient manner in composition according to the present invention with that of a BSTO thin film. As shown in FIG. 1, it has been found that the BSTSO thin film of the present invention shows low dielectric loss in proportion to the amount of $SnO_2$ added thereto. In particular, while the dielectric loss of the BSTO thin film (A) varied between 0.023 to 0.041 throughout the entire molar proportion of composition, that of the BSTSO thin film (B) varied between 0.007 and 0.031 throughout the same. The area of each circle marked in FIGS. 1 to 3 represents the equal position in each diagram where the dielectric constant is high, while the dielectric loss and tunability are low. The dielectric loss of the BSTO thin film (A) in the circle area was in the range of from 0.027 to 0.028, while that of the BSTSO thin film (B) in the circle area was in the range of from 0.013 to 0.014, which is a very low level as compared with the BSTO thin film.

Although the dielectric loss range achieved in the BSTSO thin film according to the present invention is remarkably low, it still falls short of the above-mentioned level (i.e., 0.005) required for its effective use as a DRAM capacitor. However, it has been reported that when the physical properties of a BSTO thin film such as texturing, interface, surface roughness and the like were appropriately regulated, the dielectric loss thereof can be reduced by up to half value. Considering such a report, if the deposition conditions for the BSTSO thin film according to the present invention are properly regulated, its dielectric loss can be reduced enough to a value close to 0.005.

FIG. 2 shows the results comparing the tunability of the BSTO thin film fabricated by adding $SnO_2$ to a BSTO thin film in a continuous diffusion gradient manner in composition according to the present invention with that of a BSTO thin film. As shown in FIG. 2, it has been found that the BSTSO thin film of the present invention shows poor tunability due to the addition of $SnO_2$, thereby showing linear dielectric properties. While the BSTO thin film (A) showed a tunability ranging from 8 to 50 throughout the entire composition range, that of the BSTSO thin film (B) was significantly reduced and reached zero as the amount of $SnO_2$ added increased from 5 mol % to 28 mol %. Further, the tunability of BSTO thin film (A) in the circle area was in the range of from 30 to 35, while that of the BSTSO thin film (B) in the circle area was in the range of from 3 to 4, indicating that its non-linear dielectric properties were converted to linear dielectric properties.

FIG. 3 shows the results comparing the dielectric constant of the BSTO thin film fabricated by adding $SnO_2$ to a BSTO thin film in a continuous diffusion gradient manner in composition according to the present invention with that of a BSTO thin film. As shown in FIG. 3, it has been found that although the dielectric constant was decreased due to the addition of $SnO_2$, the BSTSO thin film of the present invention still had a relatively high dielectric constant. While the BSTO thin film (A) showed a dielectric constant ranging from 157 to 726, that of the BSTSO thin film (B) was slightly decreased due to the addition of $SnO_2$ having a large ionic radius. Further, the dielectric constant of BSTO thin film (A) in the circle area was in the range of from 380 to 480, while that of the BSTSO thin film (B) in the circle area was in the range of from 200 to 230. The BSTSO thin film of the present invention showed a relatively lower dielectric constant as compared with that of the BSTO thin film, but its dielectric constant was still sufficient for DRAM applications.

Therefore, considering the results of the dielectric loss, tunability and dielectric constant illustrated in FIGS. 1 to 3, the optimized molar proportions of the composition ratio would have a dielectric loss of 0.013, a tunability of 3.4 (measured at 250 KV/cm) and a dielectric constant of 212, which corresponds to the BSTSO thin film prepared by adding 16.5 mol % of $SnO_2$ to a BSTO thin film. When the above optimized molar proportion was converted to a composition formula, a dielectric thin film composition represented by $Ba_{0.63}Sr_{0.37}Ti_{0.835}Sn_{0.165}O_3$ is obtained.

Representative molar proportions of the BSTSO dielectric thin film composition showing linear dielectric properties of a high dielectric constant, low dielectric loss and poor tunabilty are shown in Table 1 below.

TABLE 1

| Sample | x (mol %) | y (mol %) | Dielectric loss (tan δ) | Tunability | Dielectric constant |
|---|---|---|---|---|---|
| 1 | 0.06 | 0 | 0.041 | 50 | 726 |
| 2 | 0.37 | 0 | 0.027 | 35 | 384 |
| 3 | 0.82 | 0 | 0.023 | 8 | 157 |
| 4 | 0.06 | 0.28 | 0.021 | 4 | 262 |
| 5 | 0.37 | 0.165 | 0.013 | 3 | 212 |
| 6 | 0.82 | 0.05 | 0.031 | 7 | 137 |

While the present invention has been described and illustrated with respect to a number of embodiments of the invention, it will be apparent to those skilled in the art that variations and modifications are possible without deviating from the broad principles and teachings of the present invention, which is defined by the claims appended hereto.

What is claimed:

1. A dielectric thin film composition showing linear dielectric properties, which is represented by the following formula (I):

$$Ba_{(1-x)}Sr_xTi_{(1-y)}Sn_yO_3 \text{ (BSTSO)} \qquad (I)$$

wherein mole fraction x is $0.06 \leq x \leq 0.82$ and mole fraction y is $0.15 \leq y \leq 0.18$.

2. The dielectric thin film composition according to claim 1, which is prepared by adding tin oxides ($SnO_2$) to a (Ba,Sr)$TiO_3$(BSTO) thin film in a molar ratio of 15 to 18 mol % in a continuous diffusion gradient manner in composition.

* * * * *